April 30, 1929.                D. B. SALSTROM                1,710,899
                              WOOD CARVING MACHINE
                              Filed May 23, 1924              6 Sheets-Sheet 4

April 30, 1929.  D. B. SALSTROM  1,710,899
WOOD CARVING MACHINE
Filed May 23, 1924   6 Sheets-Sheet 5

Inventor:
D. B. Salstrom,
By Chindahl Parker Carlson
Attys.

Patented Apr. 30, 1929.

1,710,899

UNITED STATES PATENT OFFICE.

DAVID B. SALSTROM, OF CHICAGO, ILLINOIS, ASSIGNOR TO SALSTROM CARVING MACHINE COMPANY, OF CHICAGO, ILLINOIS, A CORPORATION OF ILLINOIS.

WOOD-CARVING MACHINE.

Application filed May 23, 1924. Serial No. 715,268.

The object of this invention, generally stated, is to produce a wood-carving machine which shall satisfy in a high degree the commercial requirements attendant upon the rapid production of large numbers of accurate copies of a given specimen of wood carving.

The invention has particular reference to the provision of a machine having a large number of cutters, and the aim has been to construct and organize the machine in such a manner that all the pieces produced shall be exact duplicates of each other and possess the necessary definiteness of outline and smoothness of surface.

It is of prime importance in the art of machine carving that all the sharp angles, corners and lines of the pattern being copied shall be reproduced with fidelity, and that the various surfaces shall be so smooth that little or no hand work shall be required to put the carvings in condition for use. Such faithfulness in reproduction and smoothness of surface are unattainable unless vibration of the cutters be reduced to the minimum. To reduce vibration of the rapidly revolving cutters, it is essential that the cutter spindles be mounted in bearings which are as tight as practicable, but such bearings inevitably become hot, and, unless guarded against, the heat will cause distortion of the parts of the machine, so that none of the pieces being carved will correspond precisely with the pattern, and the pieces being carved at different places in the machine will differ from one another. This invention, therefore, aims to meet the conflicting requirements for the reduction of vibration and the elimination of distortion due to heating of parts.

Some of the vibration to be guarded against originates in the motor or motors and in the belts by means of which power is transmitted from the motors to the cutter spindle. The invention has special reference to the provision of means whereby vibration of the cutters from such causes is reduced to a minimum.

Another object is to provide a belt drive for a plurality of cutter spindles which shall transmit substantially equal amounts of power to each of the cutter spindles.

A further object of the invention is to provide an improved work-supporting table which may be moved back and forth with ease and which shall be mounted in such a way that dust and chips shall be excluded from the table bearings, thus preventing the introduction of inaccuracies in the work due to displacement of the table.

A further object is to provide an improved construction of the headstocks and tailstocks of a wood-carving machine.

Further objects and advantages flowing from the invention will be pointed out in connection with the ensuing description of the present embodiment of my invention.

In the accompanying drawings, Fig. 2 is a left-hand end elevation of the machine. Fig. 3 is a section on line 3—3 of Fig. 1. Fig. 4 is a section on line 4—4 of Fig. 2. Fig. 4$^a$ is a section on line 4$^a$—4$^a$ of Fig. 2. Fig. 7 is a transverse vertical sectional view showing the construction of the headstocks, tailstocks and cutter-carrying head. Fig. 7$^a$ is a view of one of the spindle bearings. Fig. 7$^b$ illustrates a means for clamping the tailstock frame in adjusted position. Fig. 12 is a vertical sectional view showing the manner in which the cutter-driving motors are mounted. Fig. 13 illustrates the manner in which the work table is mounted and the means employed to exclude dust and chips. Fig. 14 is a sectional view of the means just referred to. Fig. 14$^a$ is a section on line 14$^a$—14$^a$ of Fig. 14. Fig. 15 illustrates the means for locking the table in adjusted position.

The machine comprises means to support a pattern and a plurality of pieces of wood to be carved into similarity to the pattern, and means for supporting the cutters and their driving means.

While the drawings disclose the preferred construction, it will be understood that the improved work-supporting means herein disclosed may be used in connection with cutter-supporting and driving means quite different from that herein shown, and that the cutter-supporting and driving means herein described may be used in connection with work-supporting means differing in many respects from that illustrated in the drawings.

Figures 2, 3, 4, 4A:
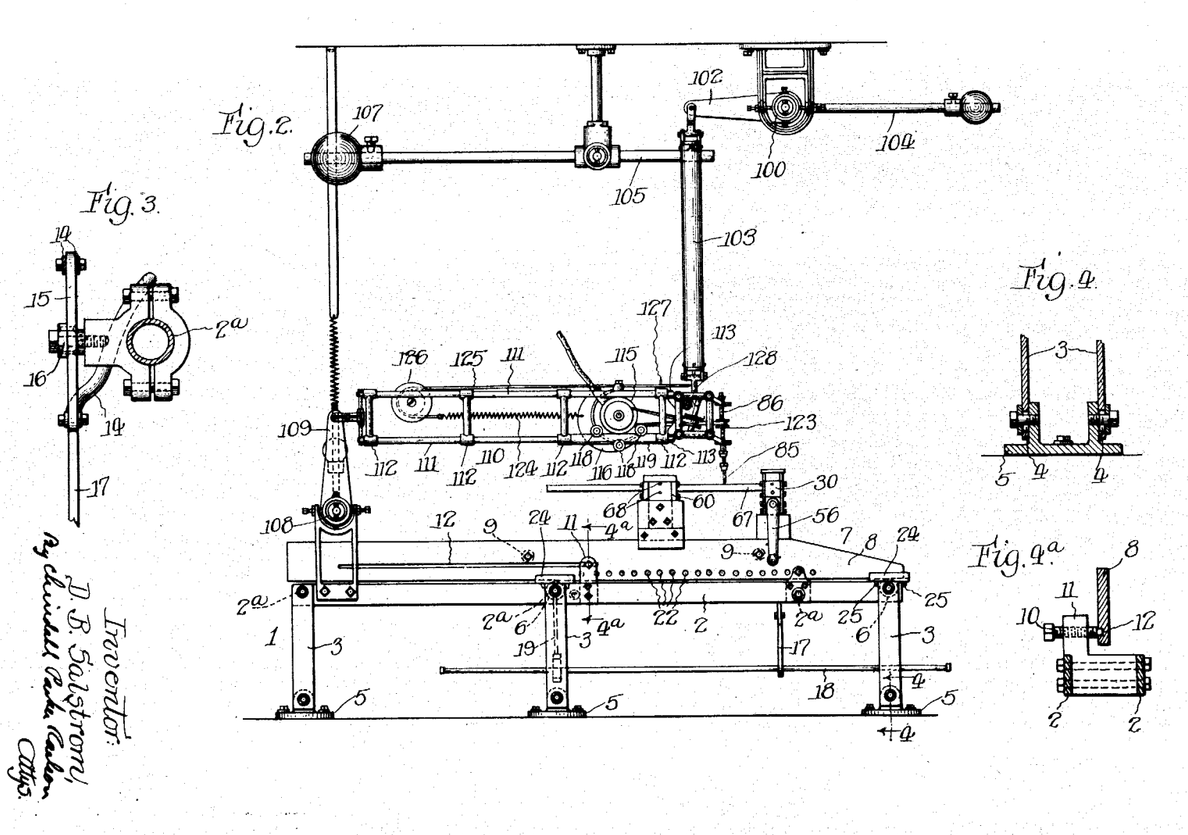
Figures 12, 13, 14, 14A, 15:
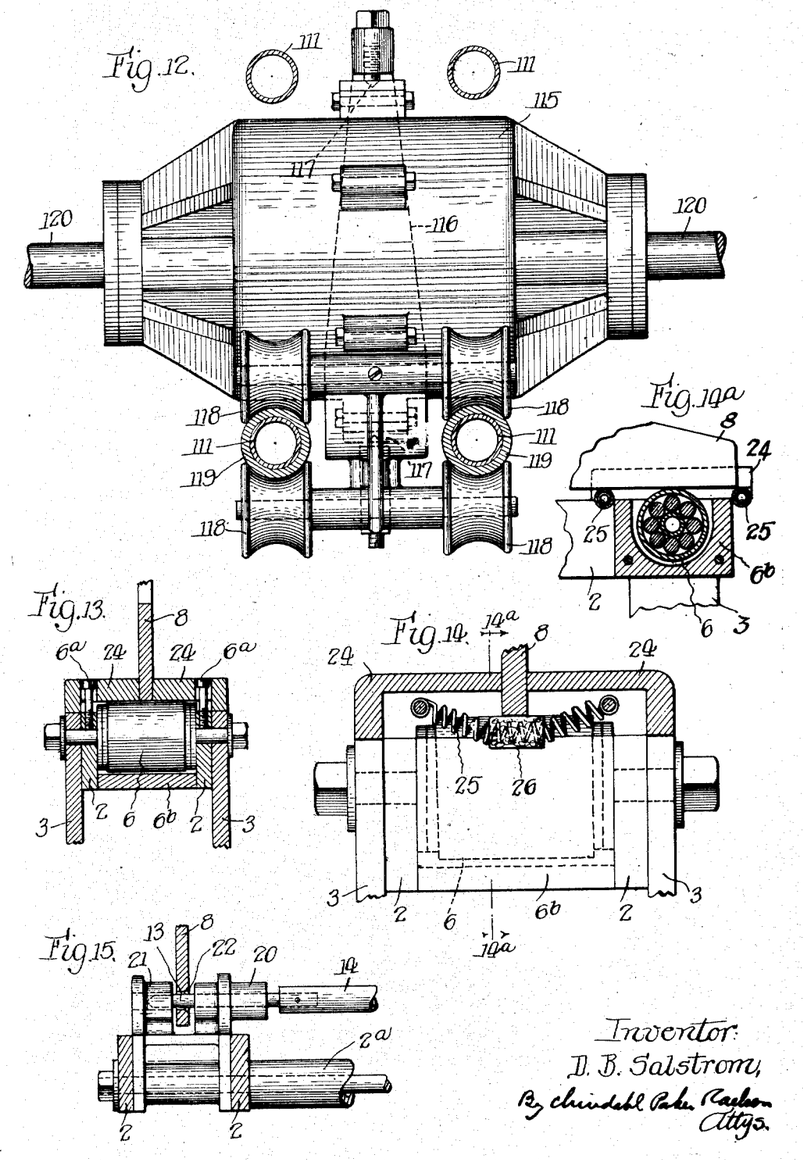

Referring first to the work-supporting means: 1 is a frame or bed comprising, in this instance, two pairs of rails 2 (Figs. 2, 13 and 15), said pairs of rails being supported in parallel relation in any suitable way, as, for example, by means of cross-pieces 2ª and legs 3. The upper ends of the legs 3 are secured in any suitable way to the rails 2. In order that the machine may be properly set upon an uneven floor, the lower ends of the legs 3 are slotted, as shown at 4 in Fig. 4, for attachment to feet 5. Each pair of rails 2 supports a plurality of anti-friction rollers 6 (Figs. 2 and 13). The shafts on which the rollers are mounted are held in place by set screws 6ª (Fig. 13). The rollers are partially enclosed by recessed blocks 6ᵇ secured between the rails 2.

The pattern and the work pieces are mounted upon a table 7 (Fig. 2) which comprises, in this instance, two parallel rails 8, the lower edges of which rest upon the rollers 6. The rails 8 are rigidly secured together by means including cross pieces 9 (Figs. 1 and 2).

Means is provided to prevent the table from being pulled so far forward as to be in danger of tipping on the front rollers 6 and to prevent the table from being pushed so far back as to be clear of the front rollers 6. This means comprises a stud 10 (Fig. 4ª) carried by a bracket 11 (Fig. 2) extending upwardly from one of the rails 2, said stud lying in a groove 12 formed in the side of the adjacent rail 8. If desired, a stud 10 may be provided at each side of the table 7.

Figure 1:
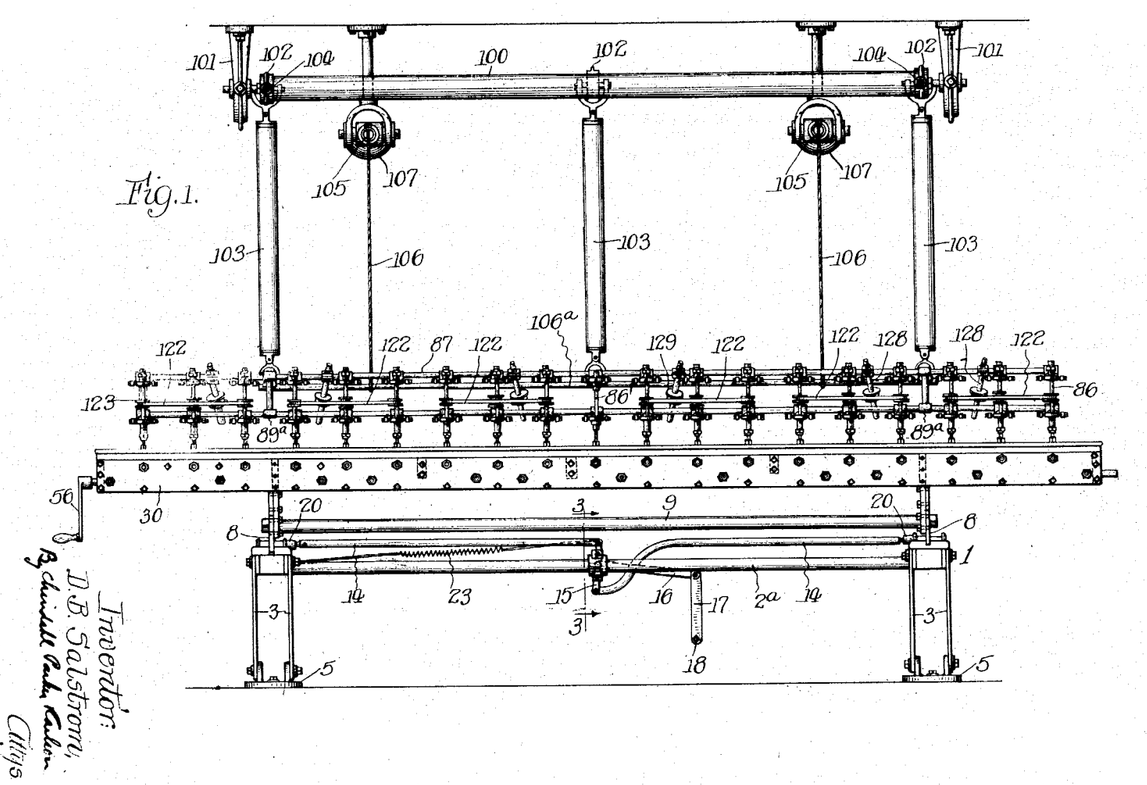
Figure 1 is a front elevation of one form of wood-carving machine embodying the features of my invention.

In order to lock the table in adjusted position, suitable locking means is provided as, for example, two bolts 13 (Fig. 15) each attached to one end of a rod 14 (Fig. 1), the other ends of said rods being pivoted to a lever 15 (Figs. 1 and 3). The lever 15 is pivotally supported upon the foremost cross piece 2ª. Rigid with the lever 15 is a crank arm 16 to which is suspended a link 17 through which a long rod 18 is longitudinally slidable. The rod 18 passes loosely through a suspending element 19 carried by one of the cross-pieces 2ª. The rod 18 extends into position where it may be conveniently depressed by the foot of the operator for the purpose of moving the bolts 13 into inoperative position. The rod 18 is of sufficient length so that the operator may slide it forward and back into convenient position for operation.

The bolts 13 are slidably mounted in guides 20 (Figs. 1 and 15) and, if desired, guides 21 may be provided in alinement with the guides 20 to receive the outer ends of the bolts 13 when the latter are in operative position. In the rails 8 are formed longitudinal series of holes 22 to receive the bolts 13. A tension spring 23 (Fig. 1) tends to turn the lever 15 in the direction to place the bolts 13 in registering holes 22. While holding the foot rod 18 depressed the operator slides the table 7 to the approximate position desired and then releases the rod 18, whereupon the spring 23 inserts the bolt 13 into two of the holes 22, if there be holes in alinement with said bolts. If the table was not positioned so as to bring two of the locking holes into register with the bolts 13, the operator pushes the table a little farther until the bolts spring into the holes. When the machine is in operation the operator usually leans against the table, thus pressing the table against the bolts 13 and holding the table steady; and in order that gravity shall cooperate in the attainment of this result, the rails 2 may be and preferably are very slightly inclined toward the rear.

If dust and chips were permitted to get between the rollers 6 and the rails 8, the table 7 would not always occupy the same plane, and inaccuracies would be introduced into the work. I therefore provide means to exclude dirt and chips from the points indicated, which means comprises pairs of wooden blocks 24 mounted upon the legs 3 at opposite sides of the rails 8 and overlying the rollers 6. The screws 6ª (Fig. 13) serve to prevent the blocks from shifting as the table is adjusted back and forth. As shown in Fig. 14, the blocks 24 are recessed upon their under sides. Two coiled tension springs 25 are connected to each pair of blocks 24 at opposite sides of the legs 3 and extend beneath the rail 8. Around each spring 25 is wrapped a piece of felt 26 or the like in position to bear upon the lower edge of the rail 8. It will be apparent from Figs. 2 and 14 that the springs 25 serve to press the blocks 24 against the sides of the rail 8, to hold the blocks down upon the upper ends of the legs 3, to hold the felt 26 in wiping contact with the lower edges of the rails 8. The rollers 6 are thus protected from dust and chips, and nothing can get in between the rollers and the rails 8 to lift the table 7 out of its proper plane of movement.

The headstocks are mounted in a head or frame 30 (Fig. 7), which head is rigidly secured to and extends transversely of the rails 8. The head 30 comprises two vertical parallel rails 31 which are secured together in spaced parallel relation by means of spacers 32 (Fig. 8) and screws 33. The top of the head 30 is closed by means of a removable cover 34.

Figures 8, 9, 10, 11:
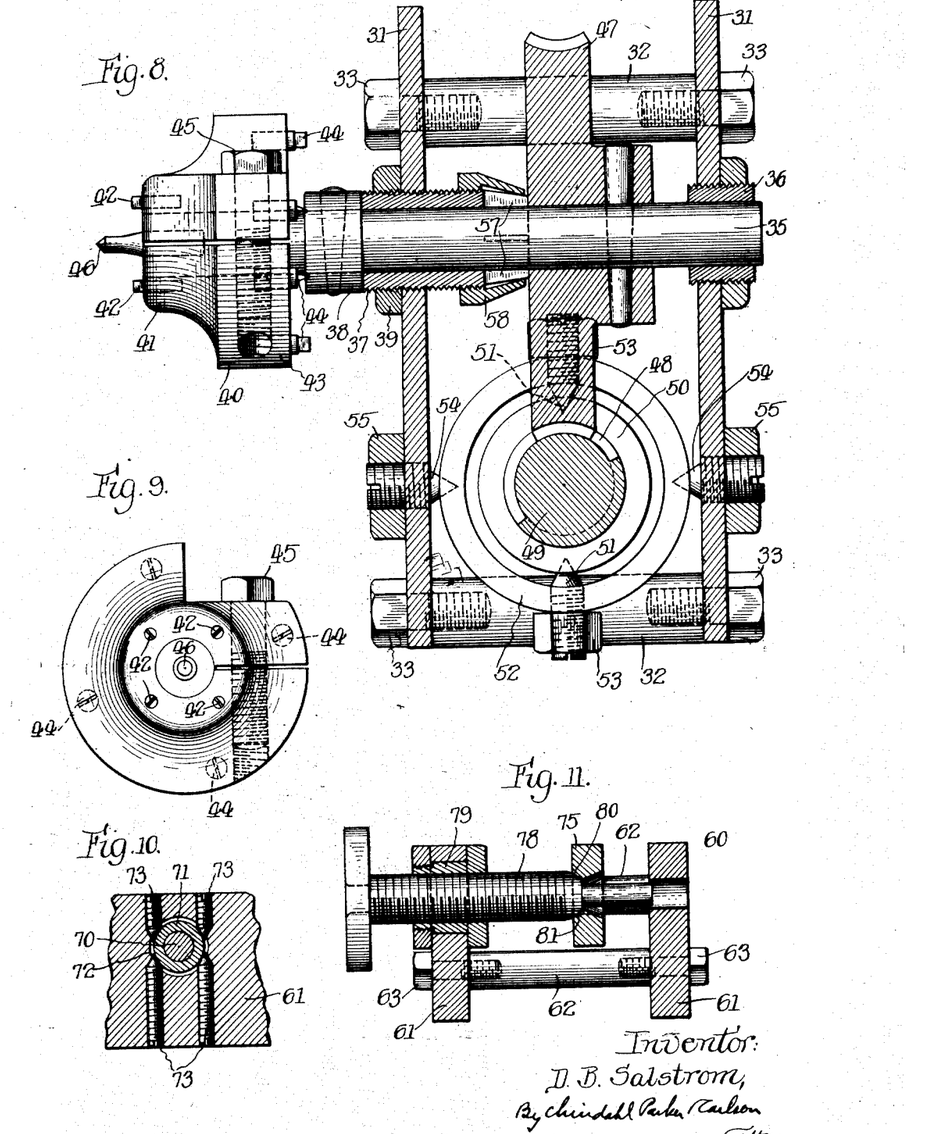
Fig. 8 is a view on an enlarged scale of one of the headstocks.
Fig. 9 is an end view of a reversible head for the headstock spindle.
Fig. 10 illustrates a means for alining the tailstock spindles.
Fig. 11 shows a means for securing the work between the headstock and tailstock centers.

The construction of the headstocks is best illustrated in Fig. 8. Each headstock comprises a spindle 35 which is rotatably mounted in bearings 36 and 37 carried by the rails 31. 38 is a collar fixed to the spindle 35 and lying against the rear end of the bearing 37. Contact of said collar with the bearing 37 serves to define the proper operative position of the headstock. Because of their length the rails 31 are usually somewhat warped. Consequently, in order that the headstocks shall all occupy the same vertical plane, the bearings 37 have a screw-thread connection with the rear rail 31, and after having been adjusted so that their rear ends are all in the same vertical plane, the bearings are secured in such position by means of the lock nuts 39.

Upon the rear end of the spindle 35 is mounted a reversible head 40, the opposite ends of which are of different diameters. The smaller end 41 is provided with a suitable number of bits 42 (Figs. 8 and 9) to engage the work. The larger end 43 of the head 40 carries a suitable number of bits 44. The head 40 is removably secured to the spindle 35 by means of a clamping screw 45. When pieces having relatively small ends are to be carved, the heads 40 are secured to the spindles 35 with the smaller end 41 extending rearwardly, as shown in the drawings. When the pieces to be carved have larger ends, the end 43 of the head 40 may be used. A center 46 is rigidly secured to the spindle 35 axially thereof.

Means is provided for simultaneously rotating all the headstocks. The means herein shown for this purpose comprises a worm wheel 47 secured to each spindle 35. The several worm wheels 47 mesh with worms 48 preferably cut in a shaft 49 extending longitudinally of and between the rails 31. The difficulties incident to the provision of a large number of perfectly alined bearings in a long head such as the head or frame 30 have been solved by providing universally adjustable bearings 50, as shown in Fig. 8. Each bearing 50 is in the form of a sleeve surrounding and supporting the shaft 49, said sleeve being, in turn, supported by two diametrically opposite cone-pointed screws 51 seated in a ring 52. 53 are nuts for locking the screws 51 in adjusted position. The ring 52 is adjustably supported by means of two diametrically opposite cone-pointed screws 54 which are seated in the rails 31 and held in adjusted position by means of lock nuts 55. The axis of the screws 54 is perpendicular to and intersects the axis of the screws 51. It will be seen that after the head stocks have been mounted in the head 30 with the rear ends of the spindles 35 in the same vertical plane, the bearings 50 for the shaft 49 may be adjusted up and down and back and forth until they are all in perfect alinement, with the worms 48 meshing properly with the worm wheels 47.

The shaft 49 may be turned in any suitable way, as, for example, by means of a crank 56. The worms 48 and worm wheels 47 are preferably cut so as to permit as little play as possible. To take up any remaining looseness between the gears 47 and 48 and any looseness of the spindles 35 in their bearings, means is provided to clamp the spindles in the bearings 37. As shown in Fig. 8, the forward end of the bearing 37 is radially split, as at 57, and the outer surface of the forward end of said bearing is made tapering so that the bearing may be contracted into clamping engagement with the spindle by means of a nut 58 turned on the bearing 37 and having an internal tapered surface coacting with the conical surface of the bearing 37. When revolving the shaft 49 to turn the work, the crank 56 is preferably turned in an invariable direction, or if the direction of rotation be changed, the work is rotated a little beyond the desired point, and then rotated reversely to the proper position.

The tailstocks are mounted in a rigid frame 60 (Figs. 2 and 7) extending parallel with the head 30 and mounted on the rails 8 for adjustment toward and away from the head 30 to accommodate work of various lengths. The frame 60 comprises two vertical parallel rails 61 which are rigidly secured together in spaced relation by means of spacers 62 (Fig. 11) and screws 63. Any suitable means may be provided for adjustably securing the frame 60 to the rails 8. In the construction herein shown the frame 60 comprises two plates 64 (Fig. 7ᵇ) which are slidable on the rails 8. At opposite sides of each plate 64 are two plates 65 which are arranged to be clamped against the rail 8 by means of bolts 66.

The frames 30 and 60 are connected together by two tie-bars 67 (Fig. 2), one at each end of the machine, said tie bars being fastened to the frame 30 and being releasably clamped to the frame 60 by means including two bolts 68.

Figure 6:
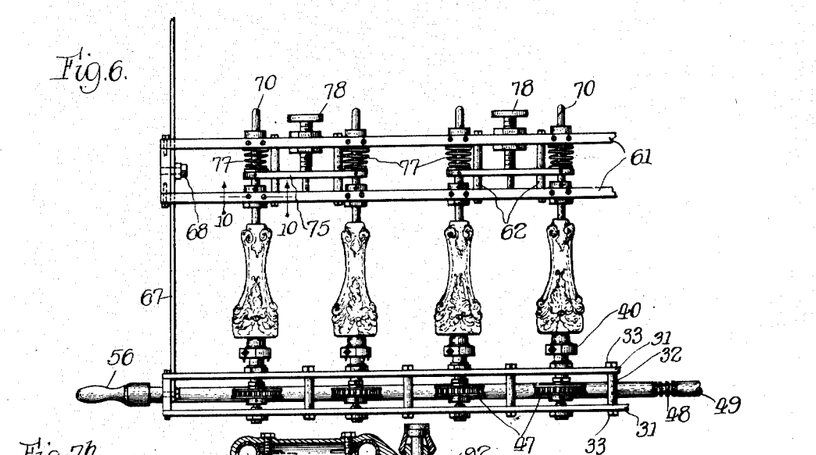
Fig. 6 is a plan view of the left-hand end of the work-carrying table.
Figures 7, 7A, 7B:
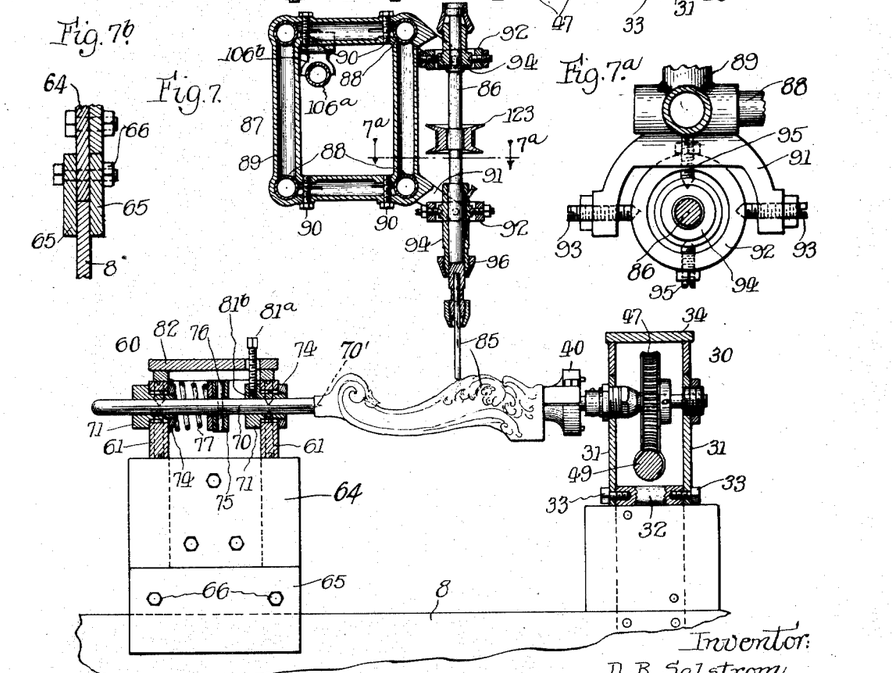

Each tailstock comprises a center or spindle 70 having a point 70′ adapted to enter a recess provided in the end of the work. In order that the long series of spindles 70 may all occupy the same plane, with each spindle perfectly alined with its companion headstock spindle 35, each spindle 70 is mounted in two universally adjustable bushings 71 (Figs. 7 and 10). These bushings are mounted in openings 72 in the rails 61, the openings 72 being sufficiently large so that the bushing may be adjusted up and down and to the right and left. The bushings 71 are supported in the openings 72 by means of four cone-pointed screws 73, the inner ends of which engage the bushing at opposite sides of a vertical plane passing through the center of the bushing and at opposite sides of a horizontal plane passing through the center of the bushing. It will be apparent from Fig. 10 that by loosening one or more screws and tightening others, each bushing 71 may be adjusted into alinement with its companion bushing 71 and with the opposite headstock spindle 35. After adjustment, each bushing 71 is secured in place by means of a nut 74 (Fig. 7). Means is provided for holding the tail stock centers 70 in engagement with the work. The means herein shown for this purpose comprises a plate 75 (Fig. 6) having openings in its ends through which two adjacent centers 70 extend. The plate 75 is loosely secured to the centers 70 by means of pins 76, as shown in Fig. 7. Surrounding each spindle 70 is a helical expansive spring 77 interposed between the rear rail 61 and the plate 75. The springs 77 urge the plate 75 in the direction to hold the tailstock centers in engagement with the work; but in order that the centers shall be unyieldingly held in engagement with the work while the machine is running, I provide a screw 78 (Fig. 11) seated in a bushing 79 in the rear rail 61 and having upon its forward end a rounded shoulder 80 adapted to bear upon the walls of an enlarged or countersunk opening 81 in the plate 75. The forward end of the screw 78 extends freely through the plate 75, as shown in Fig. 11.

To eliminate any looseness or play of the tail stock spindles 70 in the bushings 71 while the machine is in operation, I provide for each of said spindles a clamping or locking screw 81ª (Fig. 7), a block 81ᵇ being interposed between the spindle and the screw to prevent marring of the spindle.

When the work is to be removed from the machine, the locking screws 81ª are loosened and the screw 78 is backed off sufficiently to allow the operator to push the plate 75 back by hand so as to withdraw the point 70' from the work. A new piece having been placed between the headstock and the tailstock with the points 46 and 70' entering the recesses provided therefor in the work, the operator strikes the end of the tailstock center 70 projecting rearwardly from the frame 60 with a hammer or mallet to drive the work up against the end face of the head 40. The companion piece having been similarly mounted in the machine, the screw 78 is tightened up to hold the work firmly in engagement with the headstocks. The locking screws 81ª are then tightened so as to prevent any vibration due to play of the tail stock spindles in their bushings. It will be apparent that the tail stock construction just described provides convenient and expeditious means for placing the several pieces in engagement with the respective headstocks, and for insuring that the forward ends of the pieces shall all lie in the same vertical plane. The top of the frame 60 is covered by means of a removable plate 82.

The cutters 85 (Figs. 2 and 7) are carried by vertical spindles 86. These spindles are carried by a head 87 extending parallel with and above the series of headstocks and tailstocks. In order that the head 87 shall possess the necessary rigidity and lightness and be of such a nature that heat generated in the spindle bearings shall not cause deformation of the head, the latter is constructed of four lengths of steel tubing 88 rigidly secured together in spaced parallel relation so as to form a head of substantially rectangular cross-section, the tubes forming the corners thereof. The tubes are secured together by means of transverse cast-metal frames 89. There is one frame 89 for each spindle 86. The frames 89 are preferably of cast aluminum or of some aluminum alloy. As shown in Fig. 7, the frame 89 is cored out to make it lighter and to facilitate radiation of heat to the atmosphere. The tubes 88 are clamped in openings in the corners of the frames 89 by means of clamping screws 90. It will be seen that the four steel tubes 88 and the series of transverse aluminum frames 89 constitute a very light head which, notwithstanding its great length, is very rigid, and that the small amount of metal in the head facilitates the rapid radiation of heat to the atmosphere and thus prevents distortion of the head due to heat generated in the spindle bearings.

Upon the forward side of each frame 89 are two forks 91 in which the spindle bearings are mounted. Preferably these bearings are constructed as shown in Figs. 7 and 7ª. 92 is a ring mounted in the fork 91 upon two cone-pointed diametrically opposite screws 93. The ring 92 in turn supports a bearing 94 upon two diametrically opposite cone-pointed screws 95. The axis of the screws 95 is perpendicular to and intersects the axis of the screws 93, as well as the axis of the spindle 86 in the bearing 94. Preferably both the upper and the lower bearings of the spindle 86 are similarly supported. The lower bearing is provided with means 96 of any ordinary character for tightening up the bearing and thus practically eliminating vibration of the spindle.

It will be seen that heat generated in a bearing 94 cannot be conducted to the head 87 except by passing through the screws 95, ring 92, screws 93 and fork 91. These parts obviously afford a great deal of surface from which a large portion of the heat will be radiated and thus prevented from reaching the head 87. The screws 93 constitute relatively slender connections which connect the bearing to the fork and hold the bearing spaced away from the fork.

The middle pair of bearings 94 supports a dead spindle 86' (Fig. 1) to which is secured a tracer (not shown) adapted to be moved over the surface of the pattern. The latter is mounted in a headstock and a tailstock like those hereinbefore described.

The cutter-supporting head 87 is mounted in any suitable manner for movement up and down, from side to side, and forwardly and rearwardly. The means herein shown for this purpose comprises a shaft 100 extending parallel with the head 87 and supported in hangers 101 from the ceiling. Fixed to said shaft are three rearwardly extending arms 102 which are connected to the head 87 by means of members 103. 104 are weighted arms extending forwardly from the shaft 100. The head 87 is further supported by means of levers 105, the forward ends of which are connected to the head by means of cables 106, and the rear arms of which carry weights 107. The levers 105 are supported from the ceiling.

The cables 106 are not directly connected to the cutter-carrying head 87, but, on the contrary, are attached to a long steel tube 106ª (Fig. 1) extending between the frames 89ª to which the members 103 are connected. The frames 89ª are similar to the frames 89 save for the omission of forks 91. Interposed between the tube 106ª and the frames 89ª are saddles 106ᵇ (Fig. 7) which are concaved to fit said tube and frames. The saddles 106ᵇ are not attached to the tube and frames and are thus free to move slightly to accommodate themselves to the tube as the latter yields or springs under the weight of the head. It will be seen that the described manner of connecting the cables to the head provides a wide or extended bearing upon the head and prevents the head from bending under the stresses placed thereon by the cables 106.

In order to maintain the cutter-carrying head 87 in parallelism with the shaft 100, I provide means including a shaft 108 (Fig. 2) supported upon the rear part of the bed of the machine parallel with the shaft 100. Extending upwardly from the shaft 108 are three arms 109, only one of which is shown in the drawings. Each of these arms is pivotally connected to the head 87 by means of a rigid radius member 110 (Fig. 2). While this member may be of any suitable construction, it is herein shown as consisting of a frame of rectangular cross-section formed of four steel tubes 111 (Fig. 12) secured together by means of transverse cast-metal frames 112 which may be generally similar to the frames 89. The front end of the frame 110 is pivoted to the head 87 at 113 (Figs. 2 and 5), the front frame 112 being connected to the frame 89ª comprised in the head 87.

The machine shown in the drawings comprises eighteen cutters, although it will be understood that this is not the maximum number of cutters which may be employed in a machine embodying the present invention. In the machine herein illustrated the cutters are driven in groups of three, and two such groups are driven by an electric motor. Three electric motors, therefore, are provided, each being supported upon one of the members 110. The housing of one of the motors is shown at 115 in Figs. 2 and 5. In order that the vibration of the motor shall not be transmitted to the cutters, the motor is mounted in the manner to be now described. 116 is a crescent-shaped frame in which the motor is mounted to swing upon a vertical axis upon two diametrically opposite cone-pointed screws 117 (Fig. 12). Three pairs of grooved rolls 118 are mounted upon the frame 116, one pair of rolls being in front of the motor, another pair behind the motor, and the third or middle pair being below the motor. The first-mentioned two pairs are arranged to rest upon the lower pair of tubes 11, while the middle pair is mounted below said tubes. In order to dampen the vibrations of the motor and the driving belts and to prevent the rollers from moving freely upon said tubes, the latter are provided with a soft rubber cover 119. The rollers are partly embedded in the rubber covering 119 and thus are prevented from moving freely along the member 110.

Figure 5:
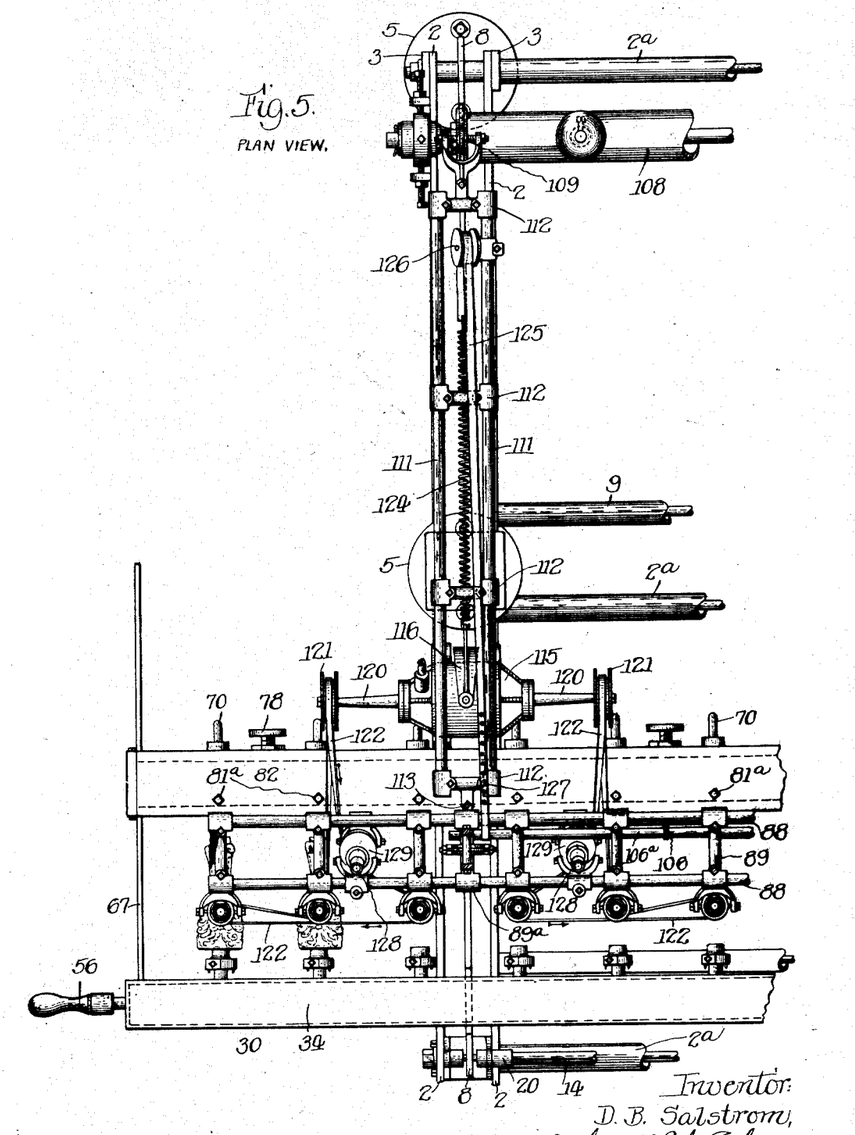
Fig. 5 is a plan view of the left-hand end of the machine, the means for suspending the cutter-carrying head being omitted.

Upon opposite ends of the armature shaft 120 are flanged pulleys 121 each receiving a belt 122 which runs in engagement with pulleys 123 on the cutter spindles 86. As shown in Fig. 5, the armature shaft 120 is of such length as to support the pulleys 121 approximately directly behind the middle pulley 123 of each group of three pulleys. Referring to the left portion of Fig. 5: after leaving the pulley 121 the belt passes an idler to be presently described, thence to the ring-hand spindle pulley, thence to the left-hand spindle pulley, thence to the middle pulley and thence to the pulley 121. In order that the portion of the belt passing in front of the middle pulley shall not touch the portion of the belt which is running in contact with said pulley, the latter is made of somewhat smaller diameter than the other two spindle pulleys. Preferably the other belt 122 extends first to the left-hand spindle pulley, as shown in Fig. 5.

The belts 122 are maintained under proper tension by means including a coiled contractile spring 124 (Fig. 2) which is attached at one end to the frame 116 and at its other end to a strap 125 which passes around a guide roller 126 and is adjustably connected at 127 (Fig. 5) to the forward end of the member 110.

Each of the idlers hereinbefore referred to comprises a shaft or spindle 128 supported in the head 87 at the proper degree of inclination by means of universally adjustable bearings which may be similar to those employed for the cutter spindles 86. On the spindle 128 is a flanged pulley 129 past which the belt 122 runs, as shown in Fig. 5. It will be seen that the idler 129 is located between the "pushing" side of the drive pulley 121 and the adjacent end pulley. As a consequence, the lessening of tension which is inevitable at the pushing side of the drive pulley is in the region between the drive pulley and the idler. By reason of the interposition of the idler, both end pulleys receive substantially the same amount of power.

When a belt 122 is to be replaced each of the two end spindles of the group of three is released from the upper fork 91 by unscrewing one of the screws 93 far enough to release the ring 92, whereupon the upper end of the spindle may be swung forward sufficiently to permit of withdrawing the belt over the upper end of the spindle.

In operation the workman moves the tracer over the surfaces of the pattern to cause the cutters 85 to reproduce those surfaces upon the pieces secured in the headstocks and tailstocks. Notwithstanding the length of the cutter-carrying head 87, its light weight and the manner in which it is mounted enable the workman to move it back and forth, up and down and from side to side with comparative ease. When desirable, the operator adjusts the table 7 forward or back to bring portions of the work into more convenient position with reference to the cutters, adjustment of the table being more particularly necessary when relatively long pieces are being carved.

By reason of the rigidity of the heads 30 and 60 which support the work and of the head 87 that supports the cutters; the uniformity with which the pieces may be mounted in the headstocks and tailstocks; the absence of play in the means for simultaneously rotating the work; the provision for absorbing vibration of the motors and driving belts, and the absence of distortion due to heating of the spindle bearings, I am able to produce at one time a large number of copies of a given pattern, the design being so faithfully reproduced and the surface being so free from pitting or roughness that little or no hand work is required to make the carvings ready for use.

Although the invention is not limited to a wood-carving machine having any particular number of cutters, the difficulties solved by the invention are greater in a machine having a large number of cutters, because of the great length of the headstock, tailstock and cutter-supporting heads.

It will be understood that various changes made be made without departing from the spirit and scope of the invention as defined by the appended claims.

I claim as my invention:

1. In a wood-carving machine, a bed, a roller mounted in said bed, a work table supported on said bed and comprising a rail resting on said roller, and means to exclude dust and chips, said means comprising two blocks mounted on said bed above said roller and at opposite sides of said rail, two tension springs connecting said blocks at opposite sides of the roller and below said rail, and means on said springs to wipe the lower edge of the rail.

2. In a wood-carving machine, a bed, a roller mounted in said bed, a work table supported on said bed and comprising a rail resting on said roller, and means to exclude dust and chips, said means comprising two blocks mounted on said bed above said roller and at opposite sides of said rail, and two tension springs connecting said blocks at opposite sides of the roller and below said rail.

3. In a wood-carving machine, a bed, a roller mounted in said bed, a work table supported on said bed and comprising a rail resting on said roller, and means to exclude dust and chips, said means comprising two blocks mounted above said roller and at opposite sides of said rail, and spring means connecting said blocks at opposite sides of the roller and below said rail.

4. In a wood-carving machine, a bed, a work table movable back and forth on said bed, and means to lock the table in adjusted position, said means comprising two locking bolts, said table having at each side a series of holes to receive one of said bolts, a guide member on the bed at each side of the table for guiding said bolts, and means for simultaneously operating said bolts.

5. In a wood-carving machine, a headstock comprising a pair of alined bearings, a spindle mounted in the bearings, the rear bearing being adjustable forward and back, said spindle having a collar arranged to engage the rear end of the rear bearing, means on the rear bearing for clamping said spindle to prevent free rotation thereof, and means for turning the spindle.

6. In a wood-carving machine, a head comprising two rails rigidly secured together in spaced parallel relation, a series of pairs of alined bearings in said rails, a spindle mounted in each pair of bearings, the rear bearings of each pair being adjustable forward and back, said spindle having a collar arranged to engage the rear end of the last-mentioned bearing, means on the last-mentioned bearing for clamping said spindle to prevent free rotation thereof, a head on the rear end of said spindle, and means for simultaneously turning all the spindles.

7. In a wood-carving machine, a head, a series of pairs of alined bearings in said head, a spindle mounted in each pair of bearings, said spindle having a collar arranged to engage the rear end of the rear bearing, means to prevent free rotation of the spindle, a head on the rear end of said spindle, and means for simultaneously turning all the spindles.

8. In a wood-carving machine, a head-stock comprising a series of bearings, said bearings being adjustable to dispose the rear ends of all the bearings in the same vertical plane, a head-stock spindle in each bearing, means on each head-stock spindle to engage the rear end of its bearing, and means for simultaneously turning all the spindles.

9. In a wood-carving machine, a frame comprising two rails rigidly secured together in parallel spaced relation, two tail stock spindles supported in said rails, and means for holding said spindles in engagement with the work comprising a plate loosely connected to said spindles, an expansive spring surrounding each spindle and interposed between said plate and one of the rails, and a screw carried by the last mentioned rail and arranged to bear against said plate at a point between said spindles.

10. In a wood-carving machine, a tail stock frame, two tail stock spindles supported in said frame for longitudinal movement, one end of each spindle being adapted to engage the work and the other end projecting from the frame for application thereto of a hammer to drive the spindle into engagement with the work, and means for holding said spindles in engagement with the work comprising a plate loosely connected to said spindles, an expansive spring surrounding each spindle and bearing against said plate, and a screw carried by the frame and arranged to bear against said plate at a point between said spindles.

11. In a wood-carving machine, a tail stock frame, two tail-stock spindles supported in said frame for longitudinal movement, and means for holding said spindles in engagement with the work comprising a plate loosely connected to said spindles, an expansive spring surrounding each spindle and bearing against said plate, and a screw carried by the head and arranged to bear against said plate at a point between said spindles.

12. In a wood-carving machine, a tail-stock frame, two tail-stock spindles supported in said frame for longitudinal movement, and means for holding said spindles in engagement with the work comprising a plate loosely connected to said spindles, spring means bearing against said plate, and means arranged to bear rigidly against said plate at a point between said spindles.

13. In a wood-carving machine, a tail stock frame, a tail stock spindle slidably mounted in said frame, one end of said spindle being adapted to engage the work and the other end of the spindle projecting from said head for application thereto of a hammer to drive the spindle longitudinally into engagement with the work, yielding means for holding the spindle in engagement with the work, and means for rigidly holding the spindle in engagement with the work.

14. In a wood-carving machine, a head-stock spindle, a tail stock frame, a tail stock spindle slidably mounted in said frame, one end of said spindle being adapted to engage the work and the other end of the tail stock spindle projecting from said frame for application thereto of a hammer to drive the tail stock spindle longitudinally into engagement with the work and thus drive the work into engagement with the head stock spindle, and means for holding the tail stock spindle in engagement with the work.

15. In a wood-carving machine, a tail stock frame, a tail stock spindle slidably mounted in said frame, one end of said spindle being adapted to engage the work, yielding means for holding the spindle in engagement with the work, and means for rigidly holding the spindle in engagement with the work.

16. A multiple-spindle wood-carving machine having, in combination, an elongated head supported for movement up and down, from side to side, and forward and back, a series of cutter spindles mounted in said head, said spindles being arranged in groups of three, a motor for driving two such groups, said motor being mounted to move up and down, from side to side, and forward and back with the head, said motor having a horizontal armature shaft provided upon each of its ends with a pulley, a pulley on each said cutter spindle, said motor pulleys being located approximately directly behind the middle spindle of each group, an idler pulley mounted on said head, and a belt for transmitting power from each motor pulley to one of said groups of spindles, said belt extending from the motor pulley to said idler, thence to the pulley on one of the end spindles of the group, thence to the pulley on the other end spindle, thence to the pulley on the middle spindle, and thence to the motor pulley.

17. A multiple-spindle wood-carving machine having, in combinaiton, an elongated head supported for movement up and down, from side to side, and forward and back, a series of cutter spindles mounted in said head, said spindles being arranged in groups of three, a motor for driving two such groups, said motor being mounted to move up and down, from side to side, and forward and back with the head, said motor having a horizontal armature shaft provided upon each of its ends with a pulley, a pulley on each said cutter spindle, said motor pulleys being located approximately directly behind the middle spindle of each group, and a belt for transmitting power from each motor pulley to one of said groups of spindles.

18. A multiple-spindle wood-carving machine having, in combination, an elongated head supported for movement up and down, from side to side, and forward and back, a series of cutter spindles mounted in said head, said spindles being arranged in groups of three, a motor for driving two such groups, said motor being mounted to move up and down, from side to side, and forward and back with the head, said motor having a horizontal armature shaft provided upon each of its ends with a pulley, and a belt for transmitting power from each of said pulleys to one of said groups of spindles.

19. A multiple-spindle wood-carving machine having, in combinaiton, an elongated head, means for supporting said head for movement up and down, from side to side and froward and back, said means including a radius member connected to and extending rearwardly from said head, cutter spindles carried by said head and arranged in groups of three, a motor movably supported on said radius member, the armature shaft of said motor being horizontal and being provided at each of its ends with a pulley, each pulley being located approximately directly behind the middle spindle of each group of spindles, a belt for transmitting power from each motor pulley to one of said groups of spindles, and means tending to move said motor rearwardly on said radius member to tension said belts.

20. A multiple-spindle wood-carving machine having, in combination, an elongated head, means for supporting said head for movement up and down, from side to side and forward and back, said means including a radius member connected to and extending rearwardly from said head, cutter spindles carried by said head, a motor movably supported on said radius member, the armature shaft of said motor being horizontal and being provided at each of its ends with a pulley, a belt for transmitting power from each motor pulley to certain of said spindles, and means tending to move said motor rearwardly on said radius member to tension said belts.

21. A multiple-spindle wood-carving machine having, in combination, an elongated head, means for supporting said head for movement up and down, from side to side and forward and back, said means including a radius member connected to and extending rearwardly from said head, cutter spindles carried by said head, a motor supported on said radius member, the armature shaft of said motor being horizontal and being provided at each of its ends with a pulley, and a belt for transmitting power from each motor pulley to certain of said spindles.

22. In a wood-carving machine, a cutter-carrying head consisting of four metal tubes, a plurality of rectangular metal frames having openings in their corners to receive said tubes, said tubes being rigidly secured in said frames, a pair of forks on each of said frames, a spindle bearing mounted in each of said forks for adjustment forward and back and from side to side, and a cutter spindle mounted in each pair of bearings.

23. In a wood-carving machine, a cutter-carrying head consisting of a plurality of longitudinal members, a plurality of transverse metal frames rigidly secured to said members, a pair of forks on each of said frames, a spindle bearing mounted in each of said forks, and a cutter spindle mounted in each pair of bearings.

24. In a wood-carving machine, a light, rigid, heat-dissipating cutter-carrying head consisting of four steel tubes forming the longitudinal members of the head, and a plurality of rectangular cast-aluminum frames having openings in their corners to receive said tubes, said tubes being rigidly secured in said frames.

25. In a wood-carving machine, a head-stock comprising two alined bearings, a spindle mounted in the bearings, said spindle having a collar arranged to engage the rear end of the rear bearings, means to prevent free rotation of the spindle, a head on the rear end of said spindle, and means for turning the spindle.

26. In a wood-carving machine, two groups of cutter spindles each group containing three spindles, two drive pulleys each located approximately directly behind the middle spindle of each group, a motor for driving both drive pulleys, and two idlers, one for each group of spindles, each idler being located between the pushing side of the corresponding drive pulley and one of the end spindles of a group.

27. In a wood-carving machine, an elongated cutter-carrying head, a series of forks projecting from said head, spindle bearings attached to and spaced from the forks, and cutter spindles mounted in said bearings.

28. In a wood-carving machine, a group of cutter spindles, a single belt for driving said group of spindles, an upper and a lower bearing for each spindle, means for attaching said bearings to the head, said attaching means comprising means for pivotally supporting the lower bearing and means for detachably connecting the upper bearing, whereby when the upper bearing is detached the spindle may be tilted forward for the replacement of the drive belt, and a drive pulley over which said belt runs.

In testimony whereof, I have hereunto affixed my signature.

DAVID B. SALSTROM.